(12) United States Patent
Onodera et al.

(10) Patent No.: US 7,940,915 B2
(45) Date of Patent: May 10, 2011

(54) APPARATUS AND METHOD FOR DETERMINING PART OF ELICITATION FROM SPOKEN DIALOGUE DATA

(75) Inventors: Sachiko Onodera, Kawasaki (JP); Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1383 days.

(21) Appl. No.: 11/413,057

(22) Filed: Apr. 28, 2006

(65) Prior Publication Data

US 2007/0154006 A1 Jul. 5, 2007

(30) Foreign Application Priority Data

Jan. 5, 2006 (JP) ................................. 2006-000559

(51) Int. Cl.
*H04M 3/00* (2006.01)
*H04M 5/00* (2006.01)

(52) U.S. Cl. ............ 379/265.06; 379/265.07; 379/266.1

(58) Field of Classification Search ............. 379/265.06, 379/168, 265.09, 88.01, 266.1, 265.08, 265.07; 704/9

See application file for complete search history.

(56) References Cited

U.S. PATENT DOCUMENTS

| | | | |
|---|---|---|---|
| 2003/0154072 A1* | 8/2003 | Young et al. | 704/9 |
| 2004/0264652 A1* | 12/2004 | Erhart et al. | 379/88.01 |
| 2005/0129216 A1* | 6/2005 | Tsujiuchi | 379/265.09 |
| 2007/0071206 A1* | 3/2007 | Gainsboro et al. | 379/168 |

FOREIGN PATENT DOCUMENTS

JP    11-025112    1/1999

\* cited by examiner

*Primary Examiner* — Thjuan K Addy

(74) *Attorney, Agent, or Firm* — Staas & Halsey LLP

(57) ABSTRACT

This apparatus calculates, from the spoken dialogue data between a customer and an operator, the speech length of each speech. Then, it estimates the structure of the spoken dialogue data based on the speech length and specifies a speech-length-characteristic change time point (time) when the speaker who makes longer speeches changes. Then it extracts an information search time point (time) when the operator performs information search from operation log information about operator's operations performed during this conversation and determined both the ending time point of a part-to-elicit from the information search time point and the starting time point of the part-to-elicit from the speech length-characteristic change time point.

18 Claims, 18 Drawing Sheets

| | OPERATOR'S SPEECH | | | | CUSTOMER'S SPEECH | | |
|---|---|---|---|---|---|---|---|
| SPEECH ID | STARTING TIME | ENDING TIME | SPEECH DURATION | SPEECH ID | STARTING TIME | ENDING TIME | SPEECH DURATION |
| 0 | 00:00 | 00:12 | 00:12 | 0 | 00:12 | 00:17 | 00:05 |
| 1 | 00:17 | 00:28 | 00:11 | 1 | 00:27 | 00:34 | 00:07 |
| 2 | 00:34 | 00:36 | 00:02 | 2 | 00:36 | 01:03 | 00:27 |
| 3 | 01:03 | 01:06 | 00:03 | 3 | 01:06 | 01:27 | 00:21 |
| 4 | 01:27 | 01:30 | 00:03 | 4 | 01:29 | 01:52 | 00:23 |
| ... | ... | ... | ... | ... | ... | ... | ... |

| SPEECH-LENGTH-CHARACTERISTIC CHANGE TIME POINT INFORMATION ||
|---|---|
| 0 | 00:27 |
| 1 | 02:11 |

FIG.10

| SEARCH EXECUTION INFORMATION ||||
|---|---|---|---|
| INDEX | TIME | SEARCH KEY | SEARCH TARGET |
| 0 | 00:29 | 123456 | CUSTOMER DB |
| 1 | 01:50 | PRINTER, BLACK | CASE DB |
| 2 | 02:03 | PRINTER, BLACK, LOWER HALF | CASE DB |
| 3 | 02:16 | PRINTER, BLACK, NOISE | CASE DB |

FIG.11

APPARATUS AND METHOD FOR DETERMINING PART OF ELICITATION FROM SPOKEN DIALOGUE DATA

CROSS-REFERENCE TO RELATED APPLICATIONS

This application claims priority from Japanese patent application Serial no. 2006-000559 filed Jan. 5, 2006, the contents of which are incorporated by reference herein.

BACKGROUND OF THE INVENTION

1. Field of the Invention

The present invention relates to an apparatus for extracting a part where an operator elicits a useful information from a customer (hereinafter referred to as a "part-to-elicit") from spoken dialogue data between an operator and a customer so that the operator or the person who are involved can listen to the particular content efficiently. Further, the present invention relates to a method for causing a computer to execute processing the above-mentioned apparatus carries out.

2. Description of the Related Art

In many call centers, spoken dialogue data between an operator and a customer has been stored so that speeches regarding numeric values such as quantity and amount or the content of a trouble can be checked later. A large amount of data accumulated in a call center is used as data for checking the content of conversation. In addition, the spoken dialogue data is also used as data for evaluating the conversation skill of an operator. Further, the spoken dialogue data is referred to by a product repair worker or a re-acceptance customer service representative for checking the content of repair or the last inquiry by listening to the information provided by the customer to the operator in the conversation, and the like.

When the spoken dialogue data is utilized, it is sufficient if only a necessary part can be listened to according to utilization purposes. To listen to all the conversation from the beginning of the spoken dialogue data to the end requires a lot of time and is not efficient. In the spoken dialogue data between the customer and the operator, a part where the operator gets the content of inquiry, a question or a notification is, so to speak, the core part in a conversation. A mechanism is required which makes it possible to determine and reproduce only this part as a "part-to-elicit".

Among conventional techniques, there is a method in which a keyword extracted by speech recognition, information about an operation performed by an operator on a terminal screen, or the like is attached to spoken dialogue data as an index, and this is used to find a starting point when the spoken dialogue data is reproduced (see Patent Document 1 "Japanese Patent Laid-Open Number 11-25112", for example).

However, even if a keyword or information about an operation by an operator which indicates the content of conversation is attached to spoken dialogue data as an index, it is impossible to know in what context the keyword or information is attached. Therefore, in order to find out a "part-to-elicit", it is required that a person concerned must actually listen to the spoken dialogue data from the position of an index considered to be related and check the content.

Furthermore, even if the starting position of the "part-to-elicit" can be specified based on the index, it is not possible to specify a range to listen to because the ending position is not specified by the index. Therefore, it is not possible to know the time required to listen to the "part-to-elicit" in advance.

SUMMARY OF THE INVENTION

The object of the present invention is to provide a processing for determining a part-to-elicit from spoken dialogue data when a necessary "part-to-elicit" is taken out from spoken dialogue data between a customer and an operator, specifying the beginning time and the end time of the "part-to-elicit" from the spoken dialogue data with the use of information about characteristics of the dialogue structure based on the lengths of speeches by the customer and the operator and information about operations performed by the operator in responding to the customer.

The apparatus according to the present invention comprises, a spoken dialogue data obtainment unit for obtaining the spoken dialogue data between a customer and an operator; an operation log acquisition unit for acquiring operation log in which log about operations performed by the operator during interaction with the customer is registered together with time information; a speech length calculation unit for calculating the lengths of speeches by each of the customer and the operator in the spoken dialogue data; a speech-length-characteristic change time point specification unit for estimating the conversation structure based on the lengths of speeches by the customer and the operator and specifying a speech-length-characteristic change time point indicating time when the conversation structure changes; and a part-to-elicit determination unit for extracting an information search time point indicating the time when the operator performed an information search processing for particular content from the operation log information, determining the information search time point as the ending time point of a part-to-elicit from the spoken dialogue data, and determining a speech-length-characteristic change time point immediately before the information search time point as the starting time point of the part-to-elicit.

The operation of the present invention will be described, taking a case where the present invention is embodied in a call center as an example. The flow of dialogue between a customer and an operator in a call center is as shown below when seen from the viewpoint of the operator side;

The first phase (Phase A): Information is got from the customer.

The second phase (Phase B): Confirms the information got from the customer or obtains an answer thereto.

The third phase (Phase C): Returns the result of confirmation or the answer to the customer.

For example, in a call center for accepting repair of a product, the flow of the processing performed by an operator is as shown below;

Phase A: Getting content of the failure of the customer's product.

Phase B: Obtaining how to cope with the got failure by searching a case database or thinks of a response based on the operator's knowledge.

Phase C: Returning the coping method obtained as a result of the search or answers by asking whether repair of the failure is to be performed.

In a call center for accepting purchase of a product, the flow of the processing performed by an operator is as shown below;

Phase A: Getting the product which a customer wants to purchase.

Phase B: Searching for inventory information about the product.

Phase C: Answering whether the product can be purchased or not.

Alternatively, the flow may be as shown below;

Phase A: Getting the customer's registered ID or new information (address, name and the like).

Phase B: Searching for or newly registering customer information.

Phase C: Informing that registration of the customer has been confirmed or that new registration has been completed.

In interaction between a customer and an operator, it is at the parts of Phase A and Phase C that conversation is actually made. Phase B is a period during which conversation is difficult to appear in the voice data because the operator is mainly performing an operation such as a search for a case and a search about inventory.

In the present invention, based on the lengths of speeches made between a customer and an operator and information about the operation by the operator, a "part where information is to be got" at Phase A is identified, with the operation by the operator at Phase B as a base point.

A computer which embodies the present invention first obtains spoken dialogue data in which the content of conversation between a customer and an operator is recorded, as a spoken dialogue data obtainment processing. Then, as an operation log acquisition processing, the computer obtains operation log in which log about operations performed by the operator during interaction with the customer is registered together with time information.

The speech length of one speaker who speaks about particular content with the initiative tends to be longer than the other. Meanwhile, when information is communicated and the communicated content is confirmed, for example, when customer information such as a name and an ID number is confirmed, the speech lengths of both sides tend to be balanced because similar words are repeated between them. By utilizing such tendencies, a position is identified where the flow of conversation between the customer and the operator changes.

Then, as a speech length calculation processing, the computer calculates the speech length of each of the customer and the operator in the spoken dialogue data. Furthermore, as a speech-length-characteristic change time point identification processing, the computer estimates the structure of the conversation between the customer and the operator and identifies a speech-length-characteristic change time point indicating the time when the conversation structure changes.

The information search processing by the operator is not executed until a search key (a number string, a character string or the like) is determined. Therefore, the time point when conversation with the customer for obtaining information for inputting a search key ends is immediately before the time when the information search processing starts. The time point when the speech length characteristic changes before the time point when input of the search key ends can be regarded as the time point when the conversation for obtaining information for inputting a search key starts.

Accordingly, as a part-to-elicit determination processing, the computer obtains search execution information about the information search processing operated by the operator, from the operation log, extracts an information search time point indicating the time when the search processing was executed, and determines the information search time point as the time point when the part-to-elicit from the spoken dialogue data ends.

Furthermore, the computer determines the speech-length-characteristic change time point immediately before the information search time point as the time point when the part-to-elicit starts.

If extracting multiple information search processing from the operation log, a part-to-elicit determination unit of the present invention may determine whether or not the extracted information search processing are mutually related, and determine the last information search time point as the ending time point if the multiple information processing are determined to be mutually related.

Further, in the present invention, when the multiple information search units perform an operation of inputting a search condition and execute a search processing under the search condition, the time point when the operation of inputting the search condition is started may be determined as the ending time point.

Alternatively, the part-to-elicit determination unit of the present invention may determine, when extracting an information search processing against a search target different from that of the multiple information search processing, together with the multiple information search processing, the time point which is after the speech-length-characteristic change time point immediately before the time points of the multiple information searches and which is the time point when the customer's speech is started first after the different information search processing is executed, as the starting point.

Further, the present invention can be embodied as a program product for causing a computer to function as the above-mentioned apparatus.

According to the present invention, it is possible to specify the starting time point and the ending time point of a part from which particular information is to be got (a part-to-elicit), from spoken dialogue data in which conversation between an operator and a customer is recorded, and thereby, a section including information to be got can be identified more accurately.

Furthermore, since it is also possible to calculate the length of the part to be got, from the spoken dialogue data, the time required for getting the information can be known in advance.

BRIEF DESCRIPTION OF THE DRAWINGS

FIG. 10 shows an example of speech-length-characteristic change time point information;

FIG. 11 shows an example of operation log information;

FIG. 17 shows a process flow of a processing for specifying a part-to-elicit-failure-from;

FIG. 18 shows a process flow of a processing for specifying a part-to-elicit-failure-from.

DETAILED DESCRIPTION OF THE PREFERRED EMBODIMENTS

Figure 1:
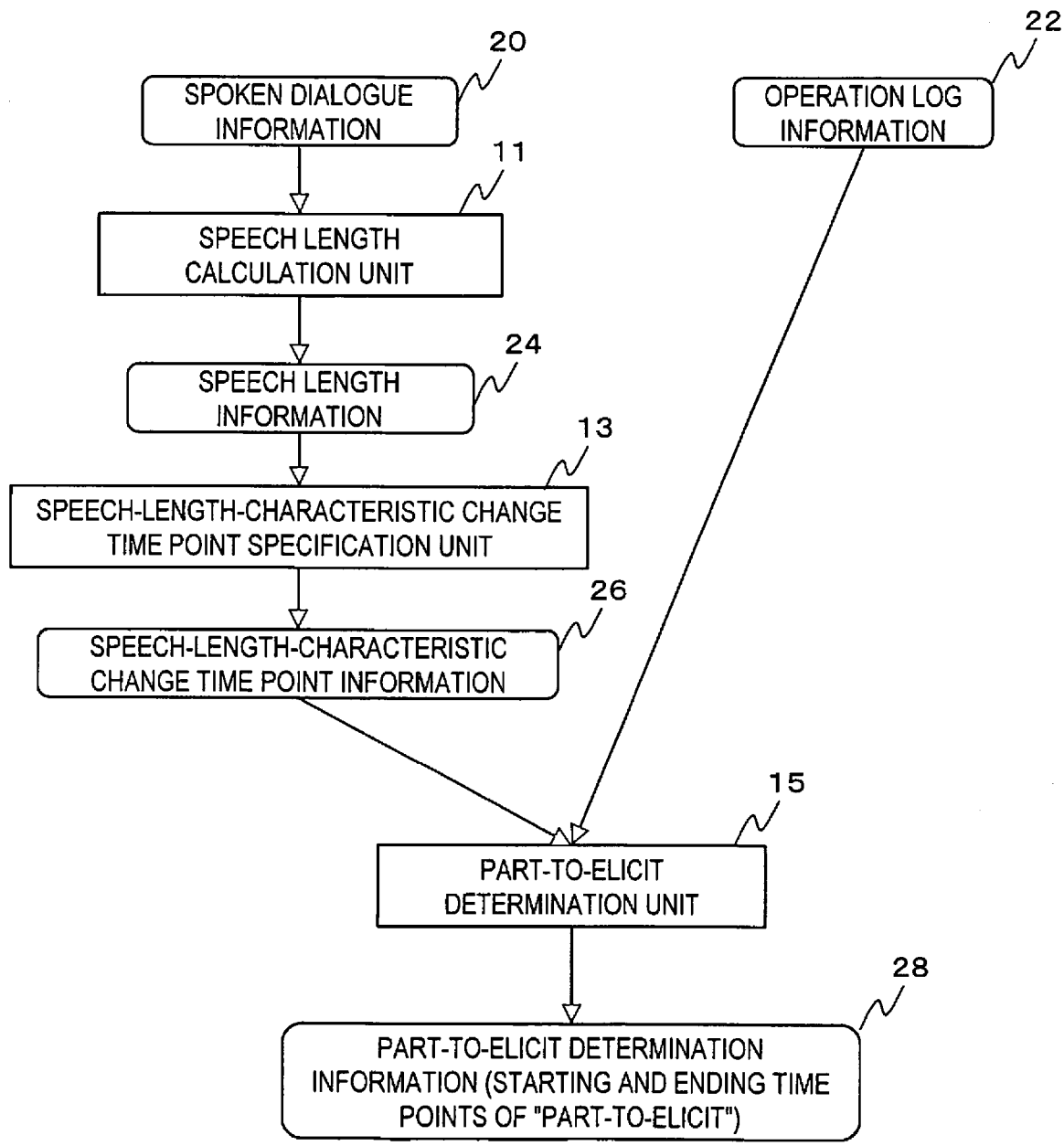
FIG. 1 shows an example of a module configuration for realizing a processing for determining a part-to-elicit from spoken dialogue data according to the present invention.

FIG. 1 shows an example of a module configuration for realizing a processing for determining a part which is used to elicit useful information from spoken dialogue data according to the present invention.

The present invention is configured by a speech length calculation unit 11, a speech-length-characteristic change time point specification unit 13 and a part-to-elicit determination unit 15.

The speech length calculation unit 11 is processing means for obtaining spoken dialogue information 20 in which speeches by each of two speakers (a customer and an operator) are recorded, and calculating information about the speech length of each speech by the customer and the operator (speech length information) 24 from this spoken dialogue information 20. Specifically, when the voices of the operator and the customer are recorded with different channels, the speech length calculation unit 11 performs a voiced section extraction processing for each channel to extract speeches from the spoken dialogue information 20 and calculates the speech length of each speech. When the voices of the operator and the customer are recorded with the same channel, separation of the speakers is performed. Each separated section is extracted as a speech, and the speech length is calculated. Then, the speech length information 24, which includes the starting time, the ending time and the speech duration (section length) of each speech, is generated.

The speech-length-characteristic change time point specification unit 13 is processing means for estimating the conversation structure of the spoken dialogue information 20 based on the speech length information 24 generated by the speech length calculation unit 11, and specifying a speech-length-characteristic change time point which is the position on time-axis where the conversation structure changes. Specifically, the speech-length-characteristic change time point specification unit 13 sequentially compares speeches by the customer and the operator within a predetermined section, and determines which speaker makes a longer speech. The time point when the speaker with the initiative changes is extracted as a speech-length-characteristic change time point. Speech-length-characteristic change time point information 26 is generated in which the extracted speech-length-characteristic change time points are recorded.

Figure 2:
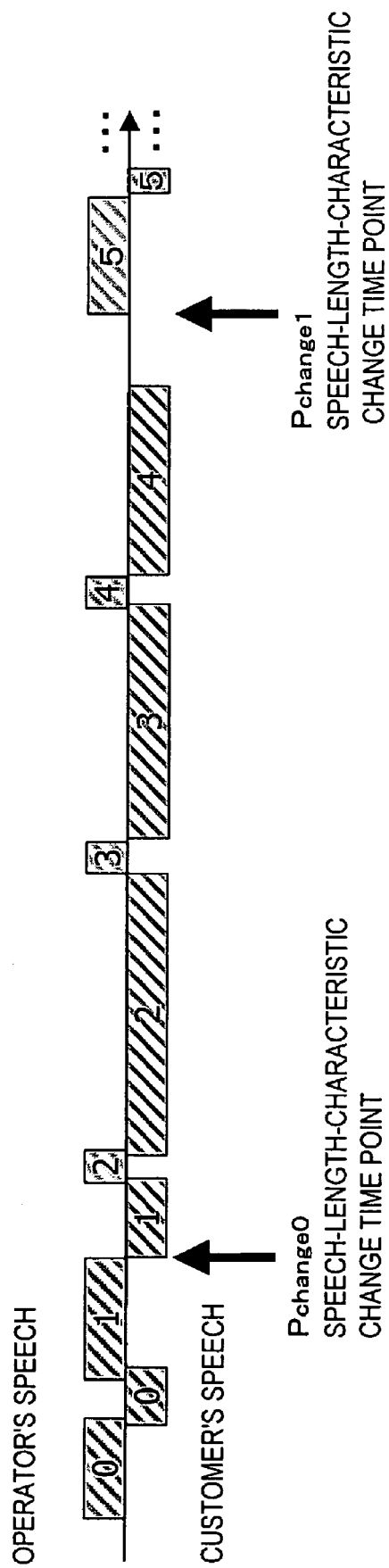
FIG. 2 shows an example of speeches by a customer and an operator and the lengths of the speeches.

FIG. 2 shows the speech length of each speech by the customer and the operator and an example of the speech-length-characteristic change time point at which a speaker who makes speeches with a longer speech length changes.

Here, in the first (speech 0) to second (speech 1) sections of the operator, the operator's speeches are longer than the customer's speeches, and in the second (speech 1) to fifth (speech 4) sections of the customer, the customer's speeches are longer than the operator's speeches. In the sixth (speech 5) and subsequent sections of the operator, the operator's speeches are longer. It is seen that the speech length characteristic is different in the section from the second speech (speech 1) to the fifth speech (speech 4) of the customer and in the sections before and after the section. Therefore, as the positions at which the speech length characteristic, namely the speaker, changes, the starting time of the customer's second speech (speech 1) and the starting time of the operator's sixth speech (speech 5) are determined as speech-length-characteristic change time points $P_{change0}$ and $P_{change1}$, respectively.

The part-to-elicit determination unit 15 is processing means for determining a "part-to-elicit" from the spoken dialogue information 20 using information regarding information searches, which is obtained from the speech-length-characteristic change time point information 26 and operation log information 22. The operation log information 22 is information which includes log about information searches, which are executed by the operator during the conversation with the customer, such as customer information search and case search, log information about operations by the operator, and the like.

The part-to-elicit determination unit 15 obtains the operation log information 22, and extracts search execution information about an information search performed by an operator, such as the time of execution of the search and a number/character string search key used for the search. The search execution information may include information about a searched database or information about the search key input by the operator.

The part-to-elicit determination unit 15 obtains from the operation log information 22 the speech-length-characteristic change time point information 26 generated by the speech-length-characteristic change time point specification unit 13 and the time when the information search processing was performed before the speech-length-characteristic change time point $P_{change1}$ indicating the end of the section.

An information search time point $P_{op}$, which indicates the time point when information search was performed by the operator, is obtained from the operation log information 22.

Then, the part-to-elicit determination unit 15 determines the time when information search was executed in the search execution information (hereinafter referred to as "an information search time point") as the ending position (ending time point) of the part-to-elicit from the spoken dialogue information 20. The speech length-characteristic change time point immediately before the information search time point is determined as the starting position (starting time point) of the part-to-elicit. Part-to-elicit determination information 28 is generated which includes these starting and ending time points of the part-to-elicit.

The part-to-elicit determination processing will be described in more detail with reference to FIGS. 3 to 7.

Figure 3:
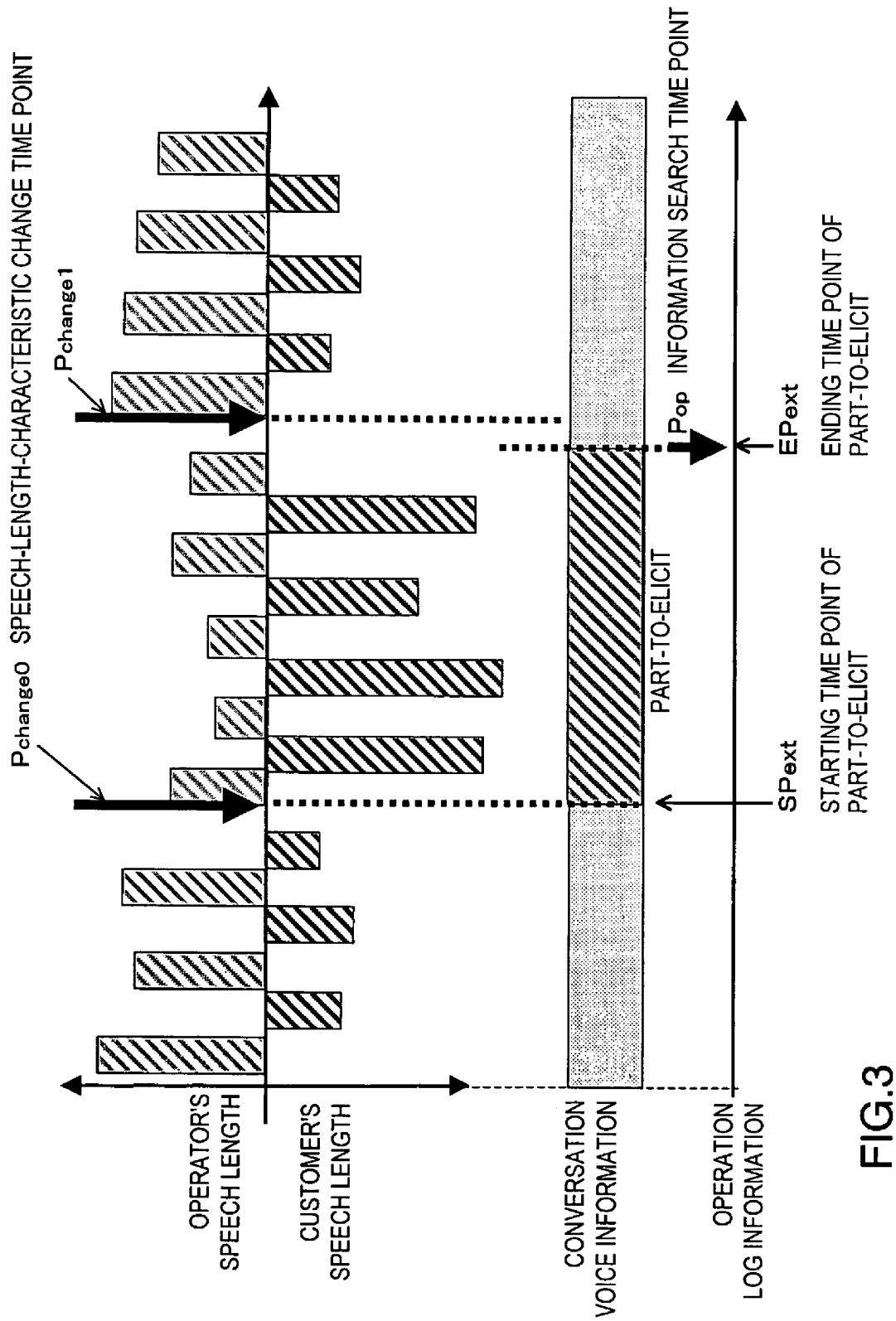
FIG. 3 is a diagram for illustrating a part-to-elicit determination processing.

It is assumed that one information search was executed by the operator as shown in FIG. 3. When the information search shown in the search execution information extracted from the operation log information 22 is such that was executed after the first speech-length-characteristic change time point $P_{change0}$ in the speech-length-characteristic change time point information 26, the part-to-elicit determination unit 15 regards the information search time point $P_{op}$ when the information search was performed as the ending time point EPext of the "part-to-elicit".

Further, the part-to-elicit determination unit 15 regards the speech-length-characteristic change time point $P_{change0}$ before the information search time point $P_{op}$ as the starting time point SPext of the "part-to-elicit".

Figure 4:
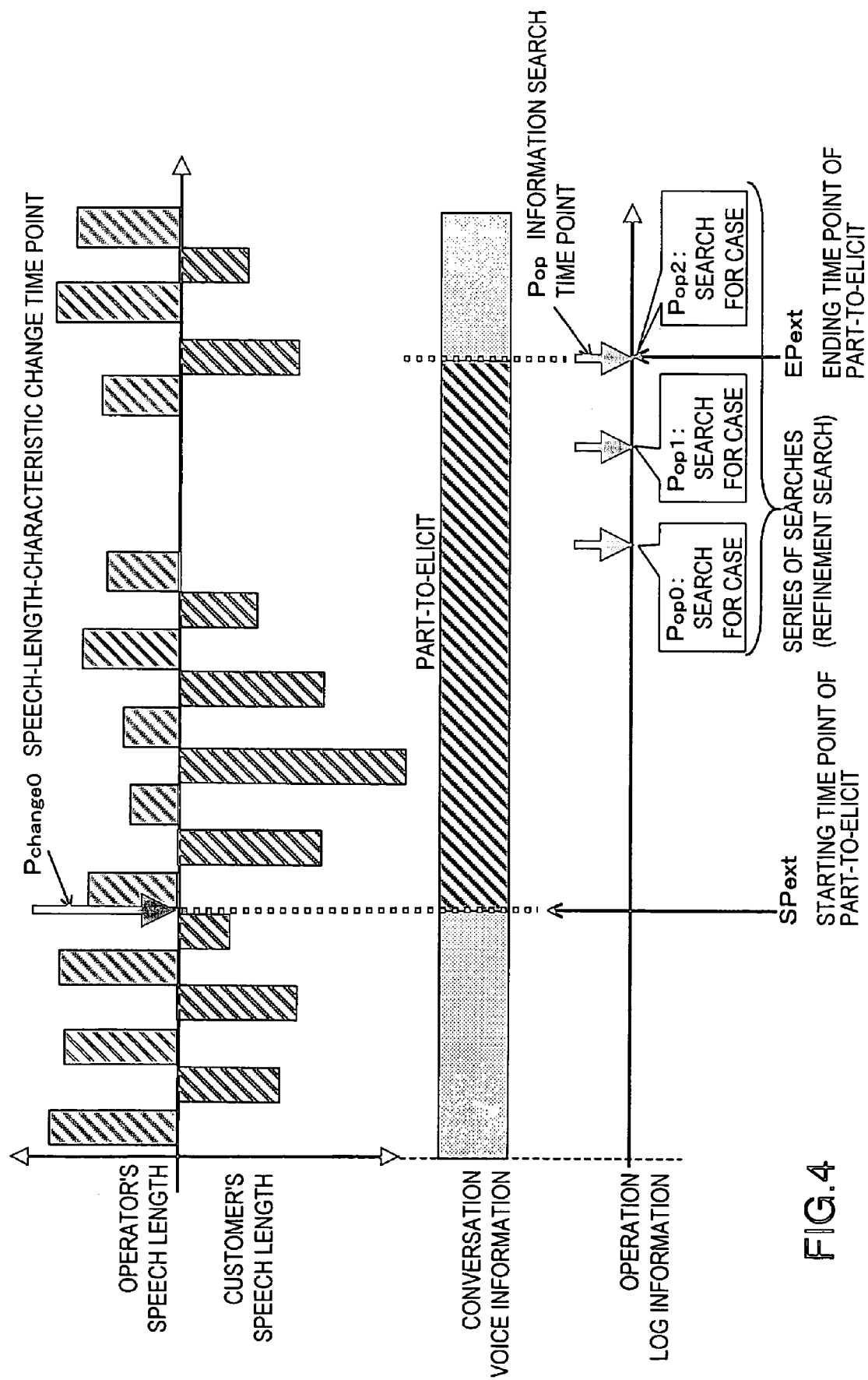
FIG. 4 is a diagram for illustrating the part-to-elicit determination processing.

It is assumed that the operator performed multiple information search processing during the conversation with customer as shown in FIG. 4. The part-to-elicit determination unit 15 obtains multiple pieces of case search execution information from the operation log information 22. The information search time points $P_{op0}$, $P_{op1}$ and $P_{op2}$ for the respective search processing are obtained. The search keys of the respective case searches are compared with one another. If there are overlapping search keys, the case searches with the overlapping keys are determined to be a series of information searches. The information search time point $P_{op2}$ of the last search processing among the series of information searches is regarded as the ending time point EPext of the part-to-elicit.

Figure 5:
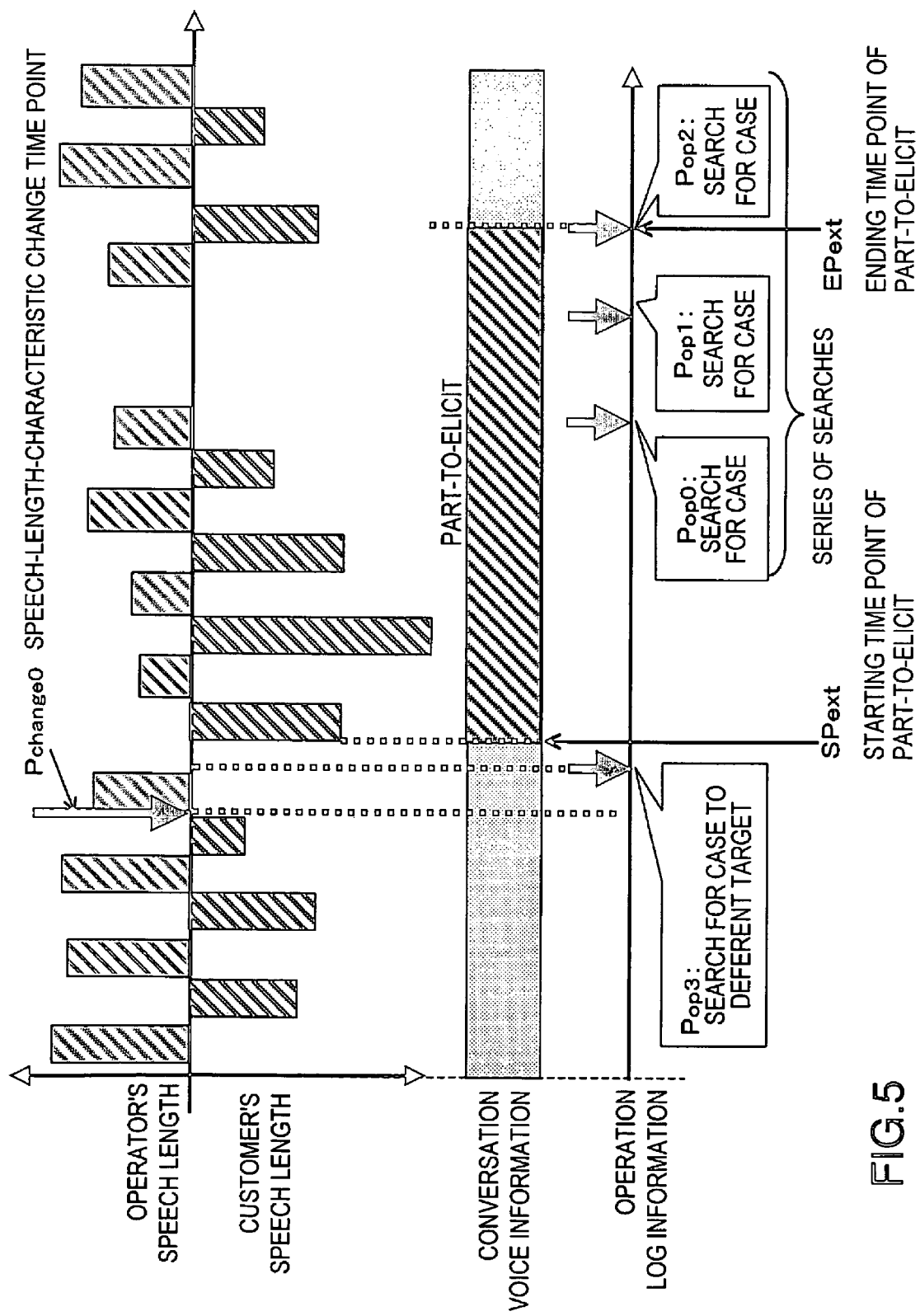
FIG. 5 is a diagram for illustrating the part-to-elicit determination processing.

It is assumed that a search target is included in the search execution information obtained from the operation log information 22, and that search execution information about each of multiple case search processing of different search targets has been obtained from the operation log information 22 as shown in FIG. 5. The part-to-elicit determination unit 15 differentiates multiple search processing (the information search time points $P_{op0}$, $P_{op1}$ and $P_{op2}$) and search processing (the information search time point $P_{op3}$) according to the search targets. Then, the part-to-elicit determination unit 15 determines whether or not these information search processing are a series of search processing based on the search keys of the case search processing (the information search time points $P_{op0}$, $P_{op1}$ and $P_{op2}$) similarly to the case of FIG. 4. If they are a series of information searches, then the information time point $P_{op2}$ of the last search processing is regarded as the ending time point EPext of the part-to-elicit.

Furthermore, the part-to-elicit determination unit 15 compares the speech-length-characteristic change time point $P_{change0}$ and the search time point $P_{op3}$ of the different search processing. If the information search time point $P_{op3}$ is after the speech-length-characteristic change time point $P_{change0}$, then the starting time point of the customer's speech immediately after the information search time point $P_{op3}$ is regarded as the starting time point SPext of the part-to-elicit.

Figure 6:
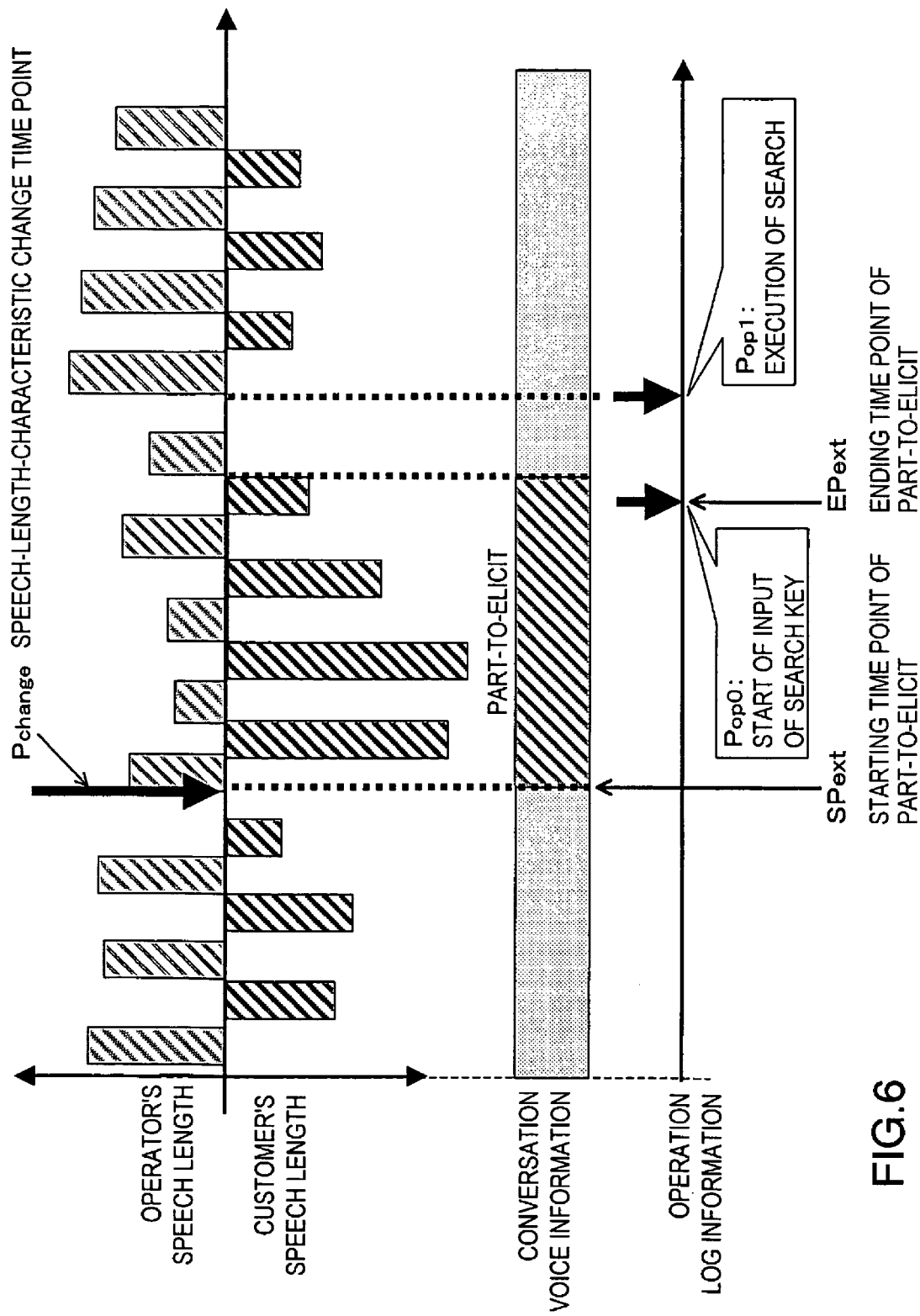
FIG. 6 is a diagram for illustrating the part-to-elicit determination processing.

It is assumed that log information about keyboard operations by the operator is also registered with the operation log information 22 together with the log information about executed information search processing. It is also assumed that the starting time of a search key input operation (the information search time point $P_{op0}$) and the time of execution of a search processing (the information search time point $P_{op1}$) have been obtained as search execution information, as shown in FIG. 6. If the section from the information search time point $P_{op0}$ to the information search time point $P_{op1}$ is voiceless, or if only the customer's last speech overlaps the information search time point $P_{op0}$ (for example, in the case where input of a search key is started after the operator's speech "Now, I'll search" and the customer's speech "Yes, please" are exchanged), then the part-to-elicit determination unit 15 regards the information search time point $P_{op0}$ of the search key input operation as the ending time point EPext of the part-to-elicit.

Figure 7:
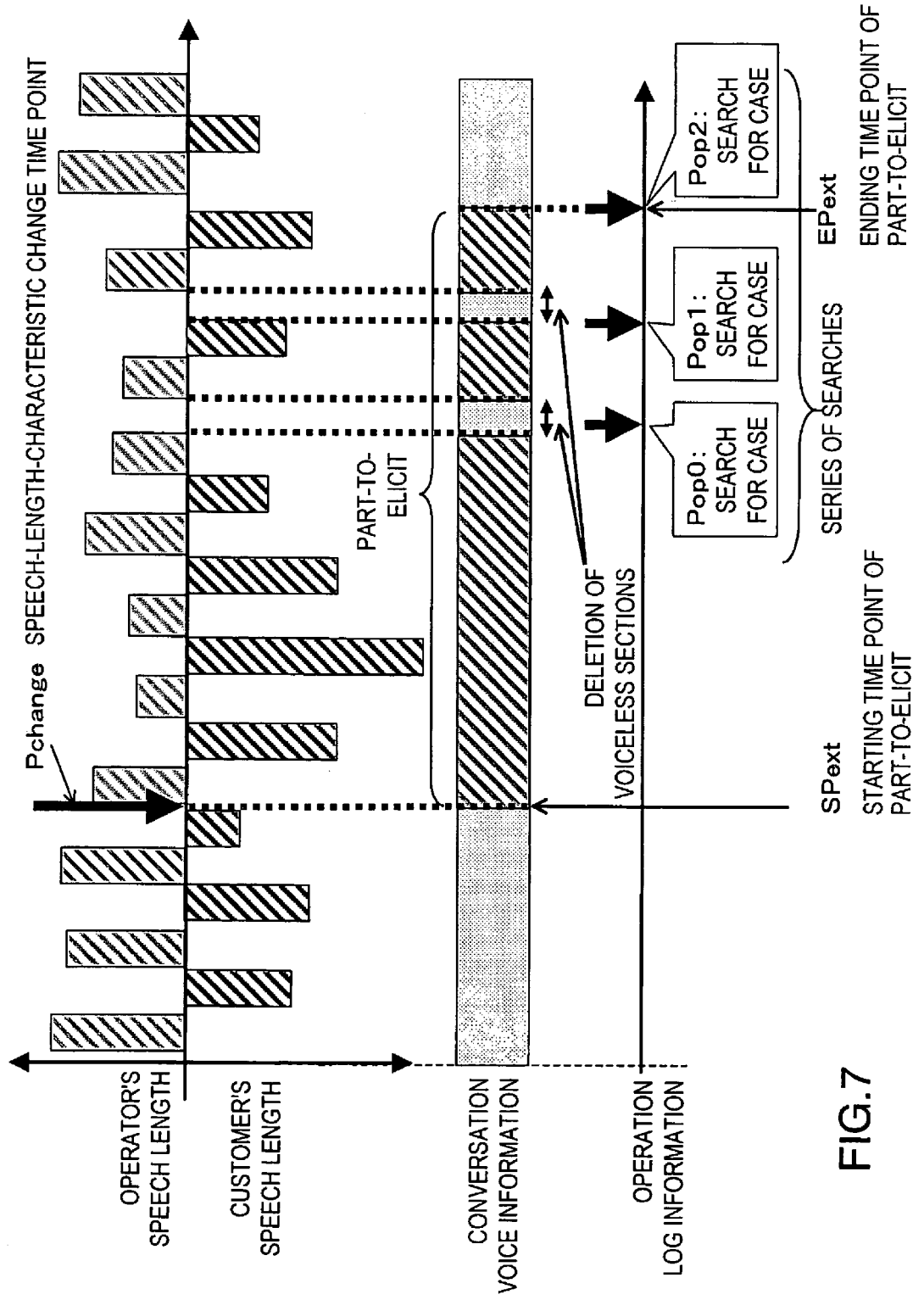
FIG. 7 is a diagram for illustrating the part-to-elicit determination processing.

Furthermore, it is assumed that there are voiceless sections made by the operator's information search operation or the like, within the identified "part-to-elicit", as shown in FIG. 7. The part-to-elicit determination unit 15 determines such voiceless sections from within the section of the determined "part-to-elicit" through an existing voiceless section determination processing or the like and extracts the part-to-elicit from which the voiceless sections have been removed.

Description will be made below on a processing example in the case where the present invention is embodied in a call center system, as a concrete embodiment of the present invention.

In the call center, an operator handles a phone call for repairing of a product from a customer. Spoken dialogue data by the customer and the operator is recorded with different channels for both and the part in which the customer is explaining the content of a failure is extracted as a "part-to-elicit" out of the spoken dialogue data. Thereby, a customer engineer (CE) can efficiently grasp failure information by listening only to the "part-to-elicit" extracted from the spoken dialogue data. When getting the content of the failure from the customer, the operator responds to the customer by looking for a method to cope with the failure by searching a case database for an appropriate case (case search), communicating the coping method to the customer, or informing the customer that a CE is to be delivered. Before and after getting the content of the failure from the customer, the operator gets information about a customer database maintenance contract, registered customer information and the like to search whether the customer is registered or not (customer information search).

Figure 8:
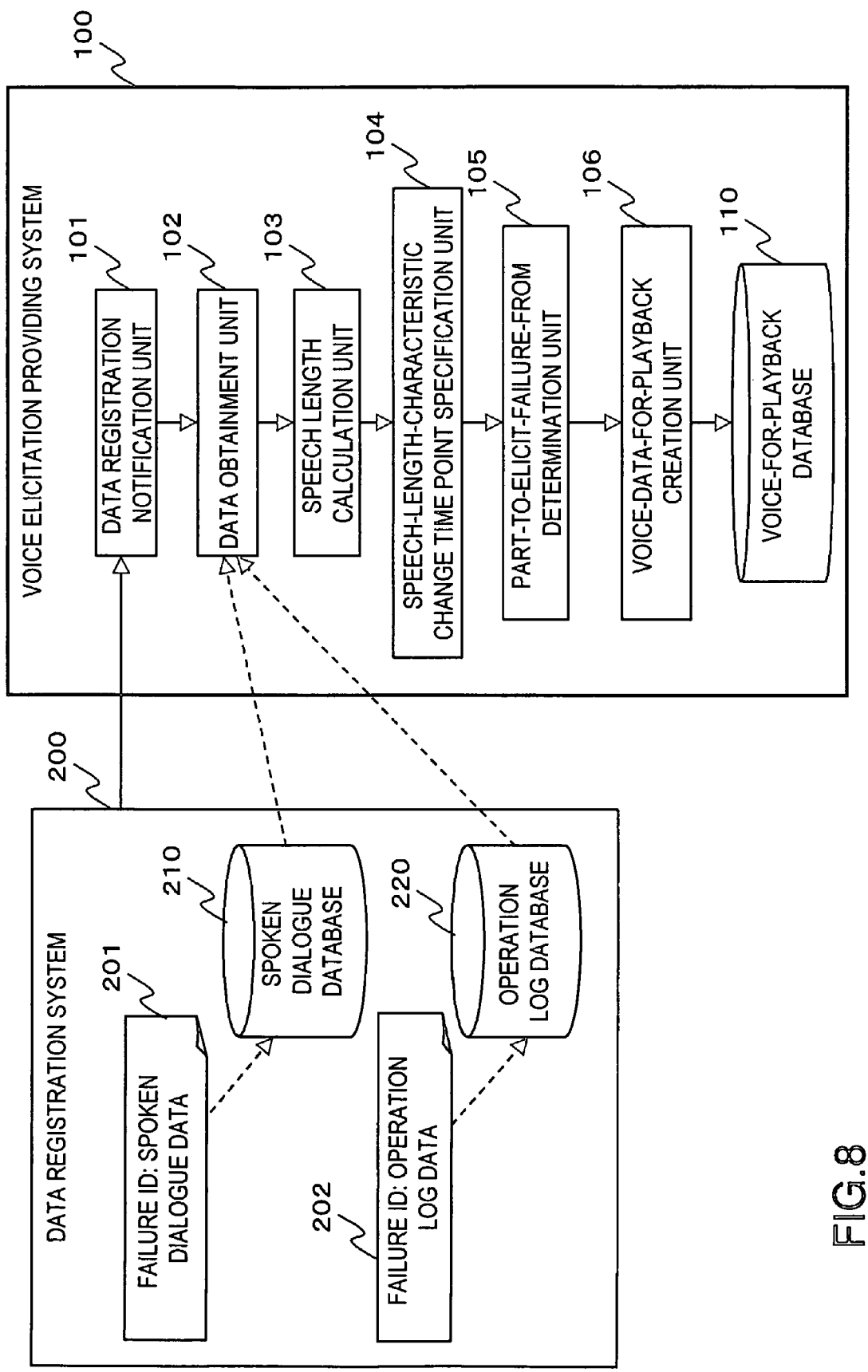
FIG. 8 shows an example of the configuration of the present invention embodied in a call center.

FIG. 8 shows an example of the configuration of the present invention embodied in a call center. The call center is provided with a voice elicitation providing system 100 and a data registration system 200.

The data registration system 200 comprises a spoken dialogue database 210 and an operation log database 220.

In the spoken dialogue database 210, there is accumulated spoken dialogue data 201, spoken dialogue data obtained by attaching identification information (a failure ID) to spoken dialogue data in which all conversation by an operator and a customer is recorded, as the spoken dialogue information 20.

In the operation log database 220, there is accumulated operation log data 202, log data obtained by attaching identification information (failure ID) to operation log data about a case search, a customer information search and the like performed by the operator during the conversation with the customer, as the operation log information 22.

The voice elicitation providing system 100 comprises a data registration notification unit 101, a data obtainment unit 102, a speech length calculation unit 103, a speech-length-characteristic change time point specification unit 104, a part-to-elicit-failure-from determination unit 105, a spoken dialogue data-for-playback creation unit 106 and a voice-for-playback database 110.

The data registration notification unit 101 is processing means for accepting data registration information to the effect that the spoken dialogue data 201 and the operation log data 202 have been registered, from the data registration system 200.

The data obtainment unit 102 is processing means for obtaining the spoken dialogue data 201 and the operation log data 202 from the spoken dialogue database 210 and the operation log database 220 of the data registration system 200 based on the data registration information.

The speech length calculation unit 103 is processing means for calculating the speech length of each speech by the customer and the operator from the spoken dialogue data 201 to generate speech length information 24.

The speech-length-characteristic change time point specification unit 104 is processing means for estimating the structure of the conversation by the customer and the operator based on the speech length information 24, specifying a speech-length-characteristic change time point at which the speaker who makes more long speeches changes, and generating speech-length-characteristic change time point information 26.

The part-to-elicit-failure-from determination unit 105 is processing means for extracting search execution information about executed information searches from the operation log data 202 and determining a "part-to-elicit-failure-from" from the spoken dialogue data 201 based on the speech-length-characteristic change time point information 26 and the search execution information.

The spoken dialogue data-for-playback creation unit 106 is processing means for extracting the "part-to-elicit" determined from the spoken dialogue data 201 and generating spoken dialogue data to be play-backed for a CE to listen to and accumulating it in the voice-for-playback database 110.

In the call center, a response to the customer is made, and each of the spoken dialogue data 201 and the operation log data 202 is stored in the data registration system 200. It is assumed that the voice of each of the speakers (the customer and the operator) is recorded with a different channel in the spoken dialogue data 201.

The data registration notification unit 101 of the voice elicitation providing system 100 receives the data registration information notified from the data registration system 200. The data registration notification unit 101 may poll the spoken dialogue database 210 and the operation log database 220 of the data registration system 200 with regard to information update.

The data registration notification unit 101 notifies the failure ID of newly registered data to the data obtainment unit 102. The data obtainment unit 102 obtains spoken dialogue data 201 and operation log data 202 corresponding to the obtained failure ID from the spoken dialogue database 210 and the operation log database 220 of the data registration system 200.

Figures 9A, 9B:
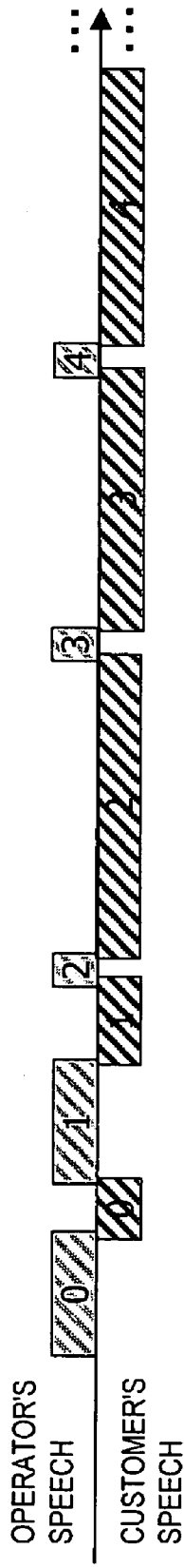
FIGS. 9A and 9B show relation between speeches by the customer and the operator in the spoken dialogue data and an example of speech length information.

As shown in FIG. 9A, the speech length calculation unit 103 performs the voiced section extraction processing for each channel to extract speeches from the spoken dialogue data 201, calculates the speech length of each speech and generates the speech length information 24 as shown in FIG. 9B. The starting time, the ending time, the speech duration (section length), and the like of each speech are recorded as the speech length information 24.

For example, in the case of the configuration of speeches shown in FIG. 9A, the speech-length-characteristic change time point specification unit 104 then sequentially compares speeches in respective predetermined sections in the speech length information 24 in FIG. 9B, extracts a speaker (the customer or the operator) who makes more speeches with a long speech length, and identifies speech-length-characteristic change time points $P_{change0}$ (00:27) and $P_{change1}$ (02:11) when the extracted speaker changes. Then, as shown in FIG. 10, speech-length-characteristic change time point information 26, in which these speech-length-characteristic change time points $P_{change}$ are recorded, is generated.

Next, the part-to-elicit-failure-from determination unit 105 obtains log information about four searches from the operation log data 202 and regards it as the search execution information. Then, processing indexes (ID), times, search keys and search targets are recorded in the search execution information as shown in FIG. 11.

The part-to-elicit-failure-from determination unit 105 extracts a search time point $P_{op0}$ (00:29) when a customer information search was performed and information search time points $P_{op1}$ (01:50), $P_{op2}$ (02:03) and $P_{op3}$ (02:16) when an information search was performed for a predetermined case database, based on the search targets in the search execution information.

Figure 12:
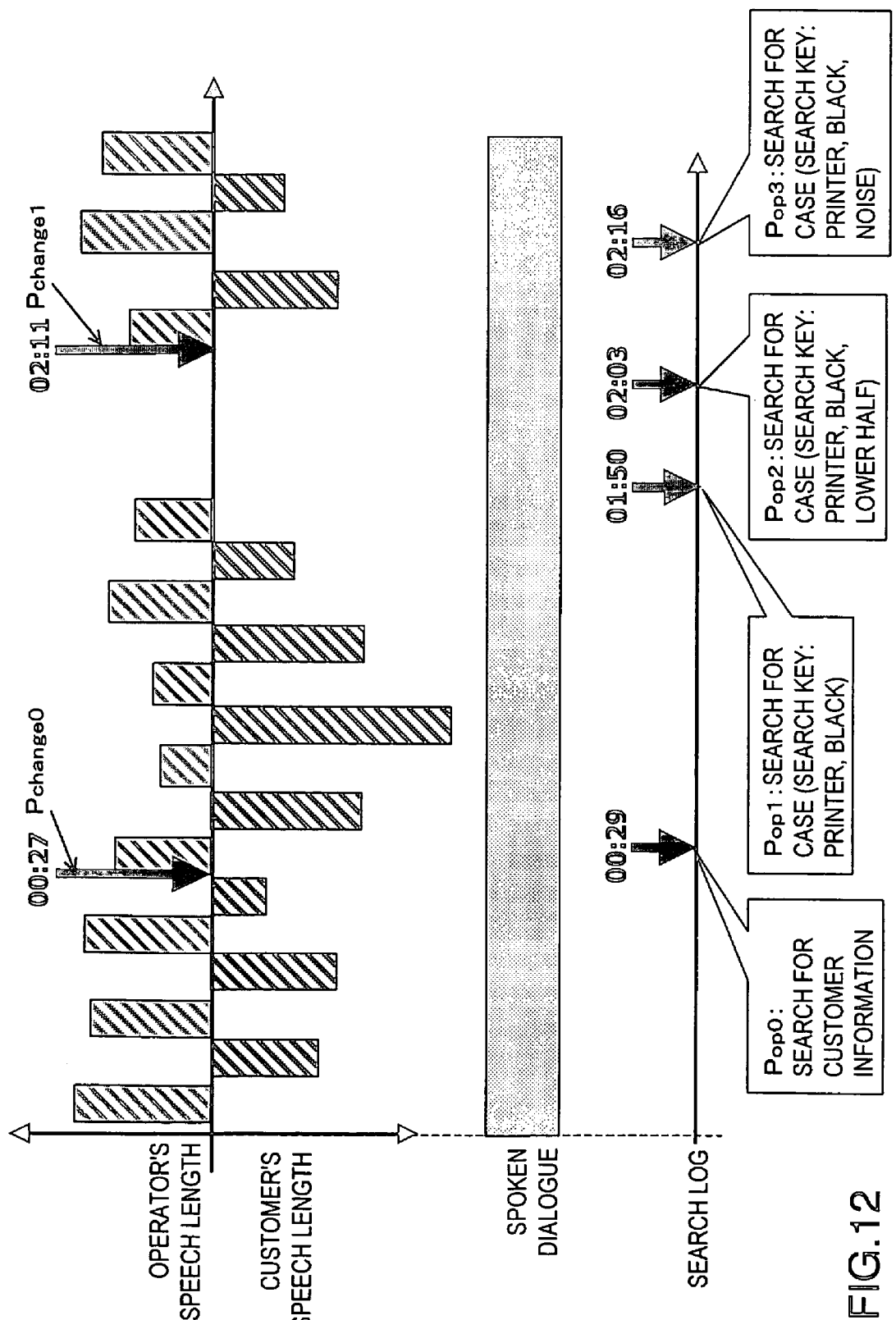
FIG. 12 shows an example of relation between speech-length-characteristic change time points and information search time points on a time axis.

FIG. 12 shows an example of relation between the speech-length-characteristic change time points $P_{change0}$ and $P_{change1}$ and the information search time points $P_{op0}$ to $P_{op3}$ on a time axis.

The part-to-elicit-failure-from determination unit 105 performs the search processing after the speech-length-characteristic change time point $P_{change0}$ to be three case searches, based on the search targets in the search execution information. Furthermore, the part-to-elicit-failure-from determination unit 105 checks whether there are overlapping search keys (character strings) based on the corresponding search keys in the search execution information to determine whether the search processing are mutually related. If these three case searches are to be a series of search processing such as a refinement search, then the last information search time point $P_{op3}$ of the multiple case searches is determined as the ending time point EPext of a "part-to-elicit-failure-from".

Figure 13:
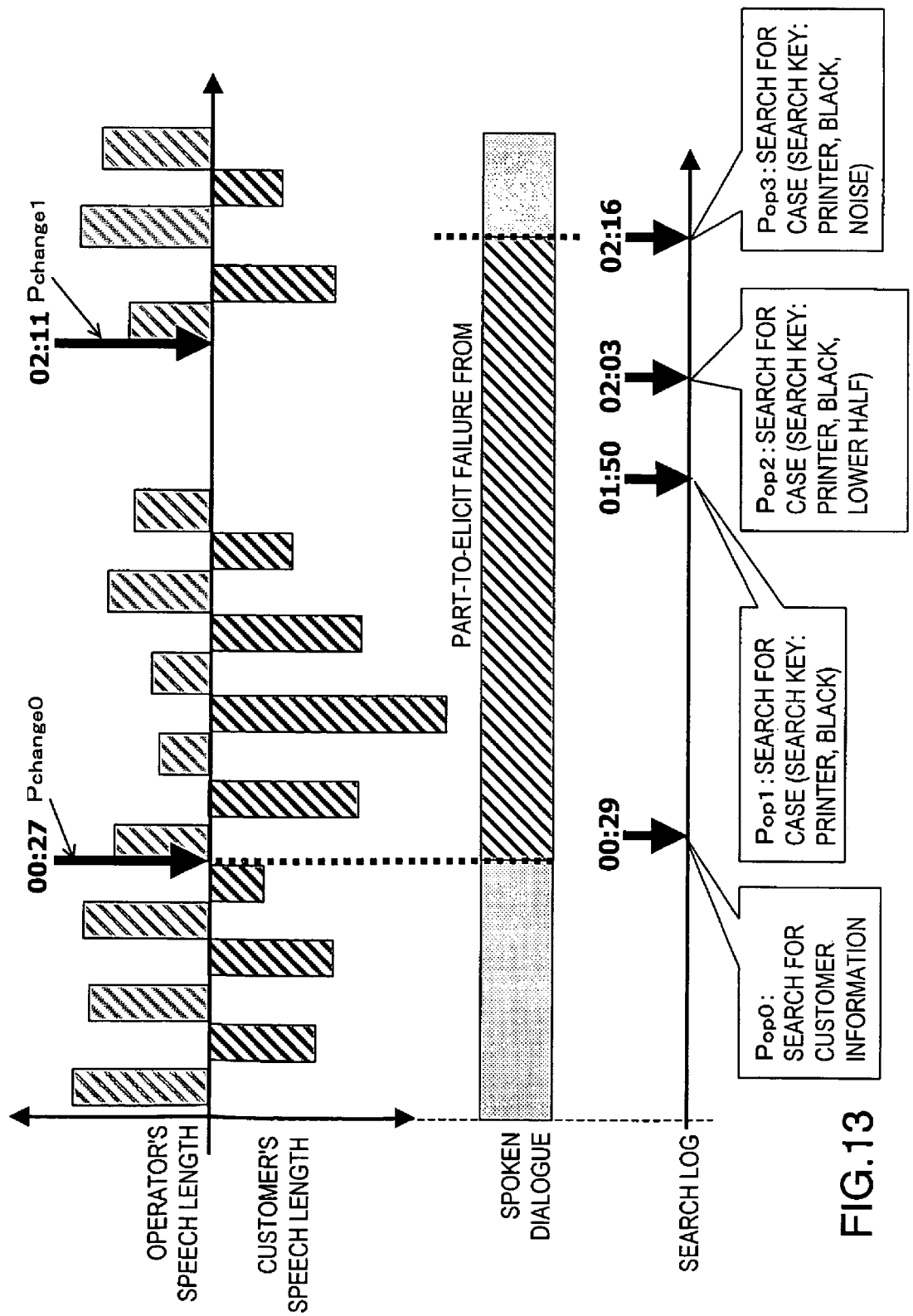
FIG. 13 is a diagram for illustrating a processing for determining a part-to-elicit for failure.

Furthermore, the part-to-elicit-failure-from determination unit 105 checks whether the information search point $P_{op0}$ is after the speech-length-characteristic change time point $P_{change0}$. If the information search point $P_{op0}$ is after the speech-length-characteristic change time point $P_{change0}$, then the information search time point $P_{op0}$ is determined to be the starting time point SPext of the "part-to-elicit-failure-from". As a result, as shown in FIG. 13, the "part-to-elicit-failure-from" is the section from the information search time point $P_{op0}$ (00:29) to the information search time point $P_{op3}$ (02:16).

Figure 14:
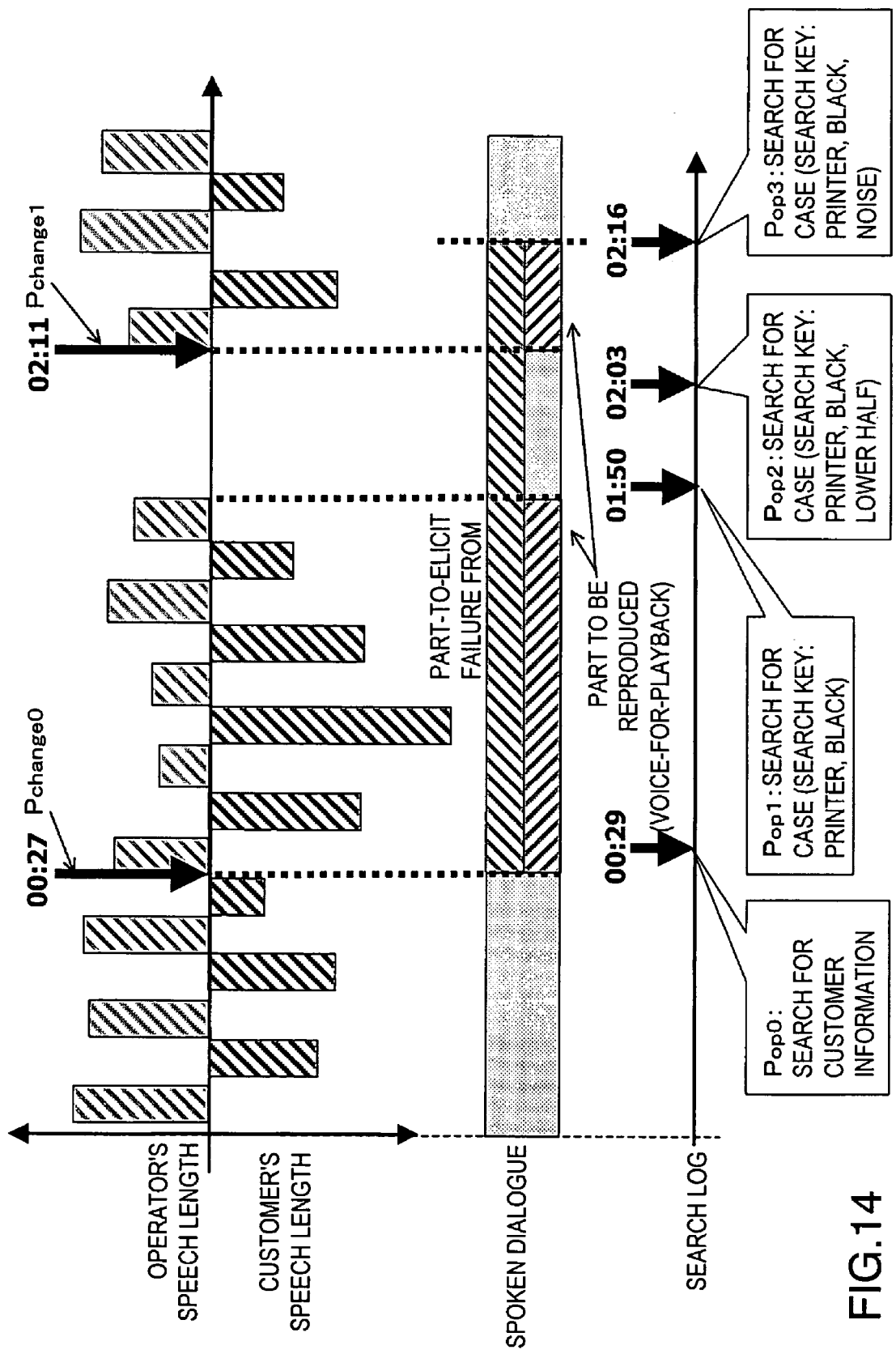
FIG. 14 is a diagram for illustrating a processing for generating spoken dialogue data to be reproduced.

Next, the spoken dialogue data-for-playback creation unit 106 obtains the starting time point SPext and the ending time point EPext of the "part-to-elicit-failure-from" from the part-to-elicit-failure-from determination unit 105, extracts the "part-to-elicit-failure-from" from the spoken dialogue data 201 as shown in FIG. 14, creates spoken dialogue data to be play-backed by removing unnecessary voiceless sections from the extracted spoken dialogue data, attaches a failure ID and registers it with the voice-for-playback database 110.

By using such spoken dialogue data to be reproduced, which has been accumulated in the voice-for-playback database 110, a CE can extract only spoken dialogue data of a part which he wants to listen to, with regard to a failure identified based on a failure ID As described above, according to the present invention, it is possible to extract only necessary spoken dialogue data from spoken dialogue data in which interaction between a customer and an operator is recorded and efficiently use it.

FIGS. 15 to 19 show examples of the process flow of the present invention.

Figure 15:
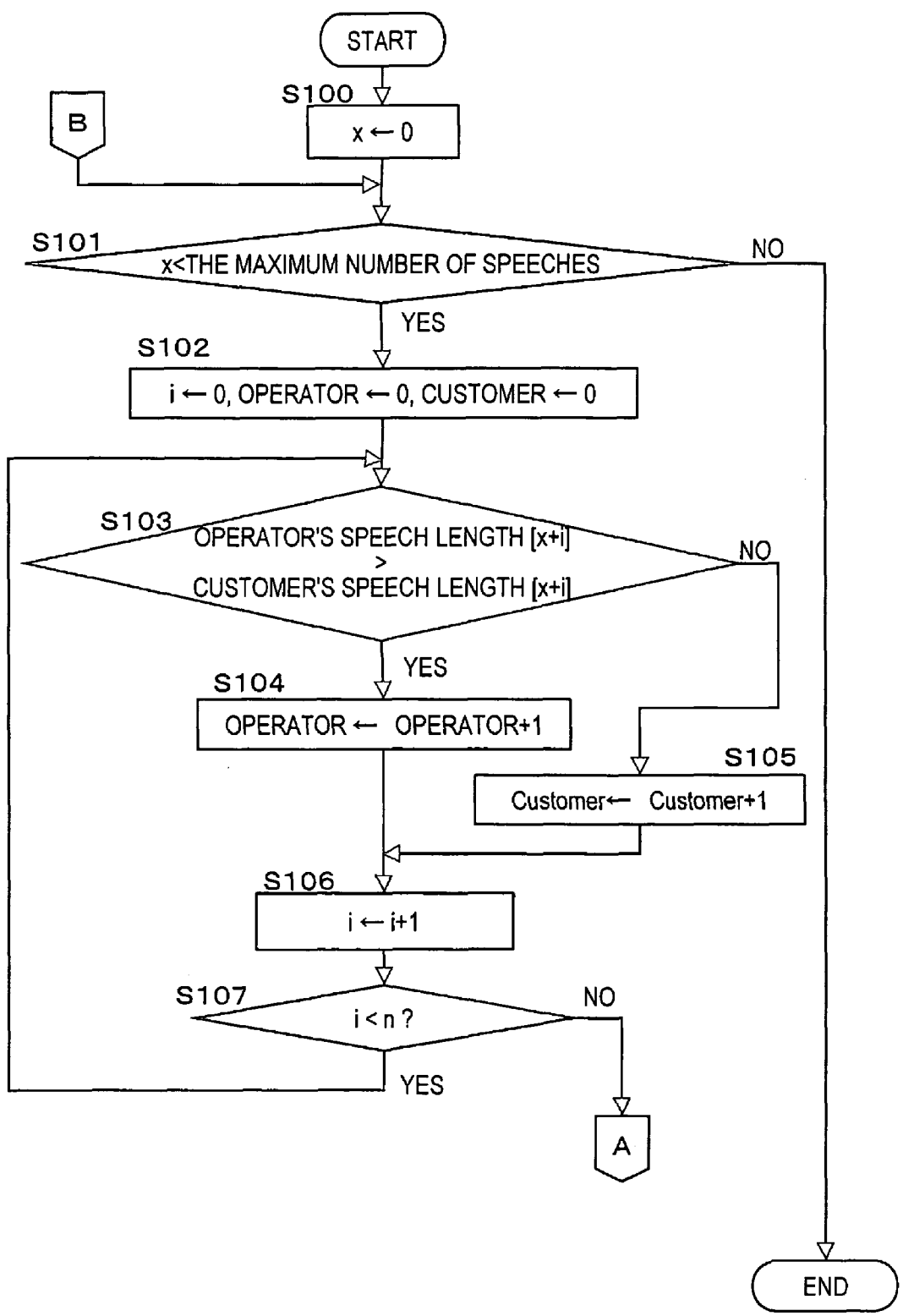
FIG. 15 shows a process flow of a processing for specifying a speech-length-characteristic change time point.
Figure 16:
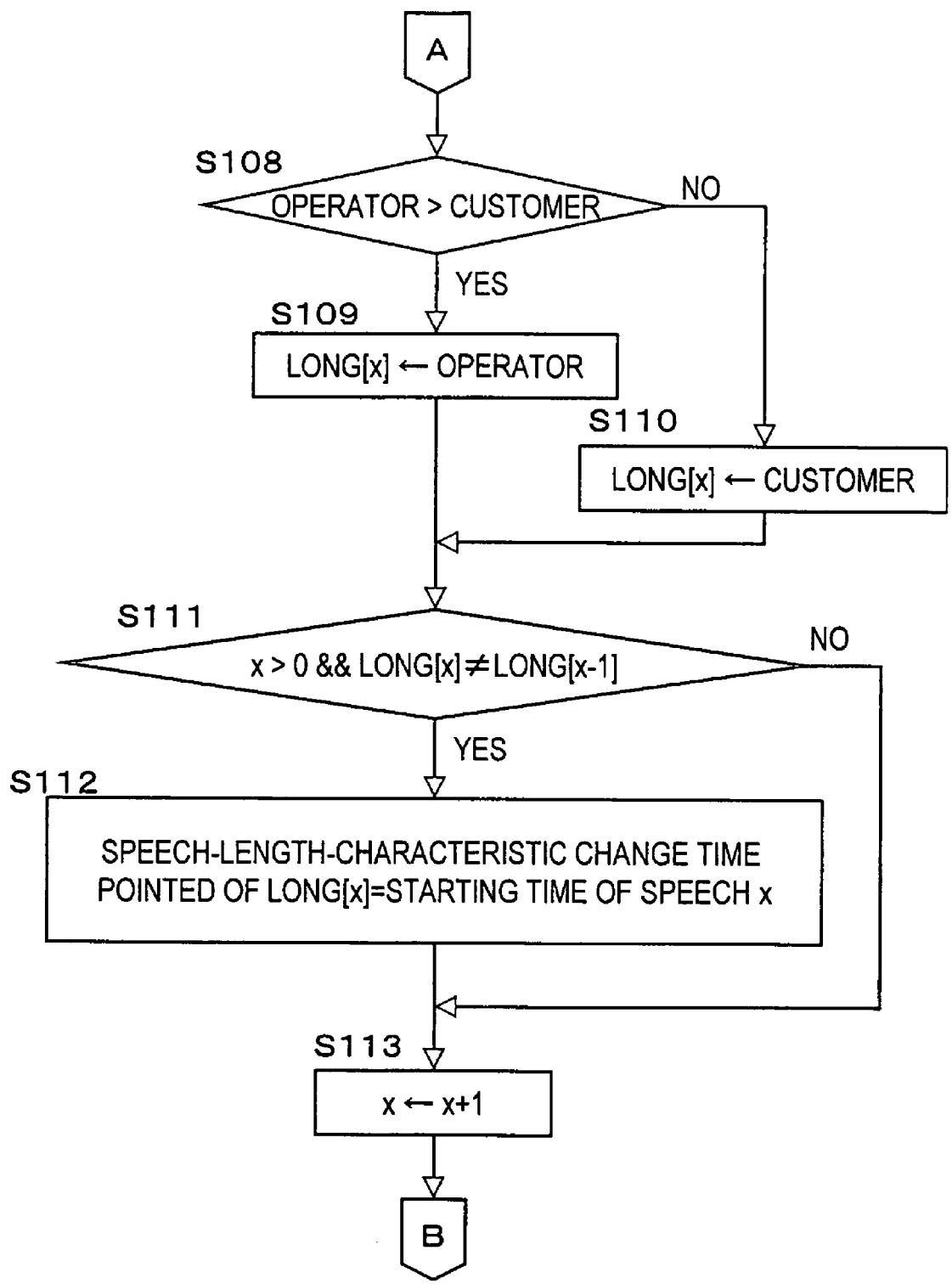
FIG. 16 shows a process flow of a processing for specifying a speech-length-characteristic change time point.

FIGS. 15 and 16 show the process flow of a processing for specifying a speech-length-characteristic change time point. The speech-length-characteristic change time point specification unit 104 sets the speech ID of speech length information (value of x) to 0 as the initial setting (step S100). When x is smaller than the maximum value of the number of speeches (step S101: YES), then the processing at and after step S102 is performed.

The speech-length-characteristic change time point specification unit 104 resets a counter i to 0, and each of a counter for the number of operator's speeches "operator" and a counter for the number of customer's speeches "customer" to 0 (step S102). Then, an operator's speech length [x] is defined as the speech length of a speech by the operator with a speech ID of x, and a customer's speech length [x] is defined as the speech length of a speech by the customer with a speech ID of x, and it is determined whether or not the operator's speech length [x] is larger than the customer's speech length [x] (step S103).

If the operator's speech length [x] is larger than the customer's speech length [x] (step S103: YES), then the speech-length-characteristic change time point specification unit 104 adds 1 to the counter for the number of operator's speeches "operator" (step S104). If the operator's speech length [x] is not larger than the customer's speech length [x] (step S103: NO), then 1 is added to the counter for the number of customer's speeches "customer" (step S105).

Then, 1 is added to the counter i (step S106), and while the counter i indicates a number smaller than a predetermined number of windows n (step S107: YES), the processing from steps S103 to S106 is repeated.

If the counter i is equal to or above the number of windows n (step S107: NO), then the speech-length-characteristic change time point specification unit 104 determines whether or not the counter for the number of operator's speeches "operator" is larger than the counter for the number of customer's speeches "customer" (step S108). If the number indicated by the counter for the number of operator's speeches "operator" is larger than the number indicated by the counter for the number of customer's speeches "customer" (step S108: YES), then the speech-length-characteristic change time point specification unit 104 substitutes "operator" into Long[x] for recording who is a speaker with speeches with a long speech length during the speeches with the speech ID's x to x+n−1 (step S109). If the number indicated by the counter for the number of operator's speeches "operator" is not larger than the number indicated by the counter for the number of customer's speeches "customer" (step S108: NO), then the speech-length-characteristic change time point specification unit 104 substitutes "customer" into Long[x] indicating a speaker with speeches with a long speech length (step S110).

The speech-length-characteristic change time point specification unit 104 determines whether or not "x>0&&Long[x]≠Long[x−1]" is satisfied, which is a condition for determining whether the speaker who makes more speeches with a long speech length changes (step S111). Only when the above determination condition is satisfied (step S111: YES), the starting time point of a speech by Long[x] having a speech ID of x is regarded as a speech-length-characteristic change time point $P_{change}$ (step S112).

Then, 1 is added to x (step S113), and the process returns to the processing at step S101. While x is smaller than the maximum number of speeches (step S101: YES), the processing at and after step S102 is repeated. When x exceeds the maximum number of speeches (step S101: NO), the processing is terminated.

Specifically, the speech-length-characteristic change time point specification unit 104 compares the speech length of a speech by the operator with the speech ID of 0 [0] and the speech length of a speech by the customer with the speech ID of 0 [0], where it is assumed that the counter i=0 and the window width n=3. Since the speech length of the operator's speech is longer, the number of operator's speeches "operator" is counted up (operator=1; customer=0). Furthermore, the counter i is counted up (i=1), and the speech length of a speech by the operator with the speech ID of 1 [1] and the speech length of a speech by the customer with the speech ID of 1 [1] are compared. Since the speech length of the operator's speech is longer, the number of the operator's speeches "operator" is counted up (operator=2; customer=0). Furthermore, the counter i is counted up (i=2), and the speech length of a speech by the operator with the speech ID of 2 [2] and the speech length of a speech by the customer with the speech ID of 2 [2] are compared. Since the speech length of the customer's speech is longer, the number of the customer's speeches "customer" is counted up (operator=2; customer=1). When the counter i is counted up (i=3), i<n is not satisfied, and the number of the operator's speeches "operator" and the number of the customer's speeches "operator" are compared. Here, the number of the operator's speeches is larger, the speaker who made more speeches with a long speech length during speeches with the speech ID's 0 to 2 is determined to be the operator, that is, Long[0]=operator.

Furthermore, the speech-length-characteristic change time point specification unit 104 counts up x (x=1) and determines Long[1], the speech length characteristic during speeches with the speech ID's 1 to 3. Here, Long[1]=customer is determined. Therefore, it is determined that the speech length characteristic changes, and the starting time of a speech with the speech length [1] by the customer is determined as the speech length-characteristic change time point $P_{change0}$.

Figure 17:
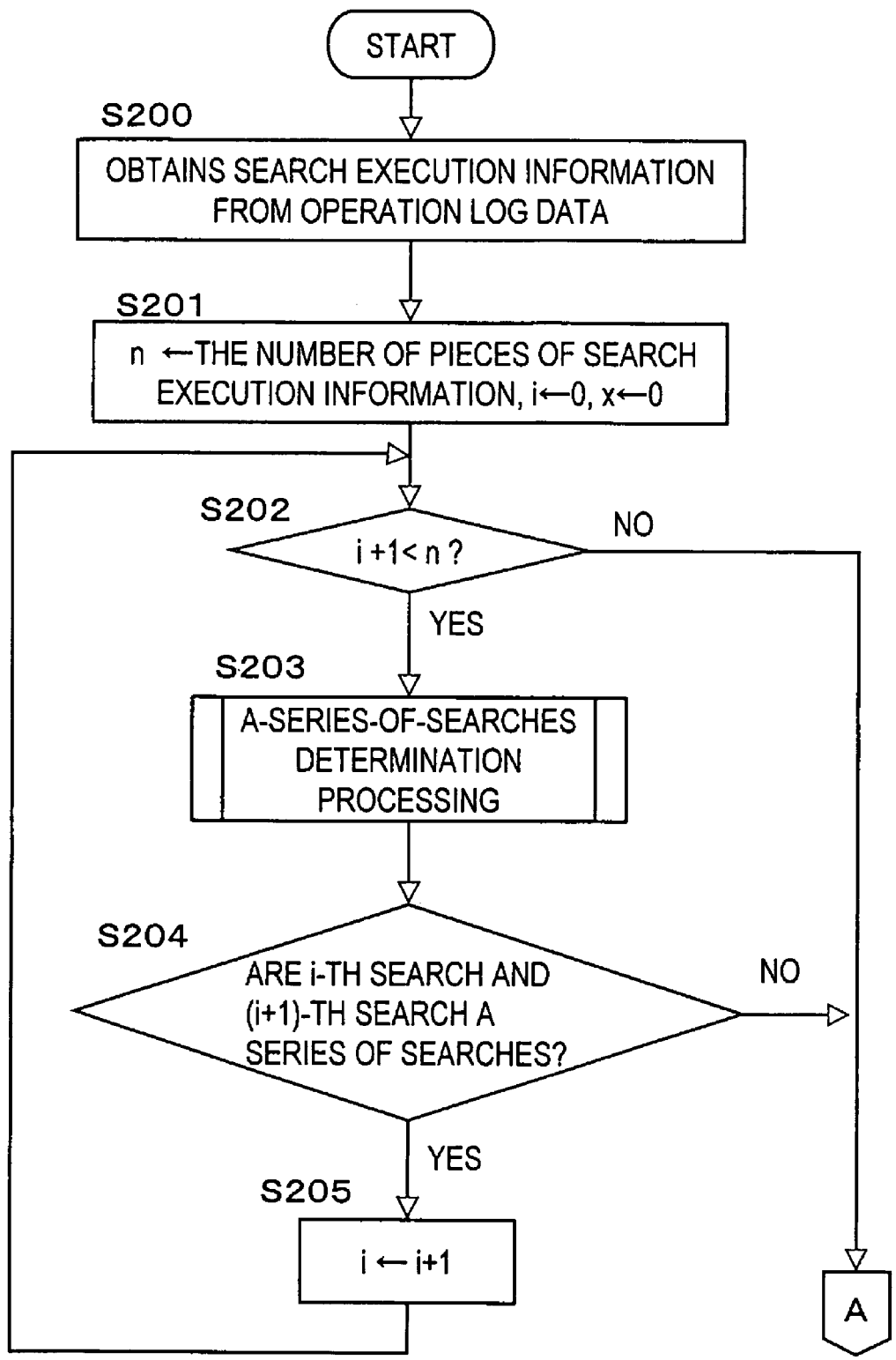
Figure 18:
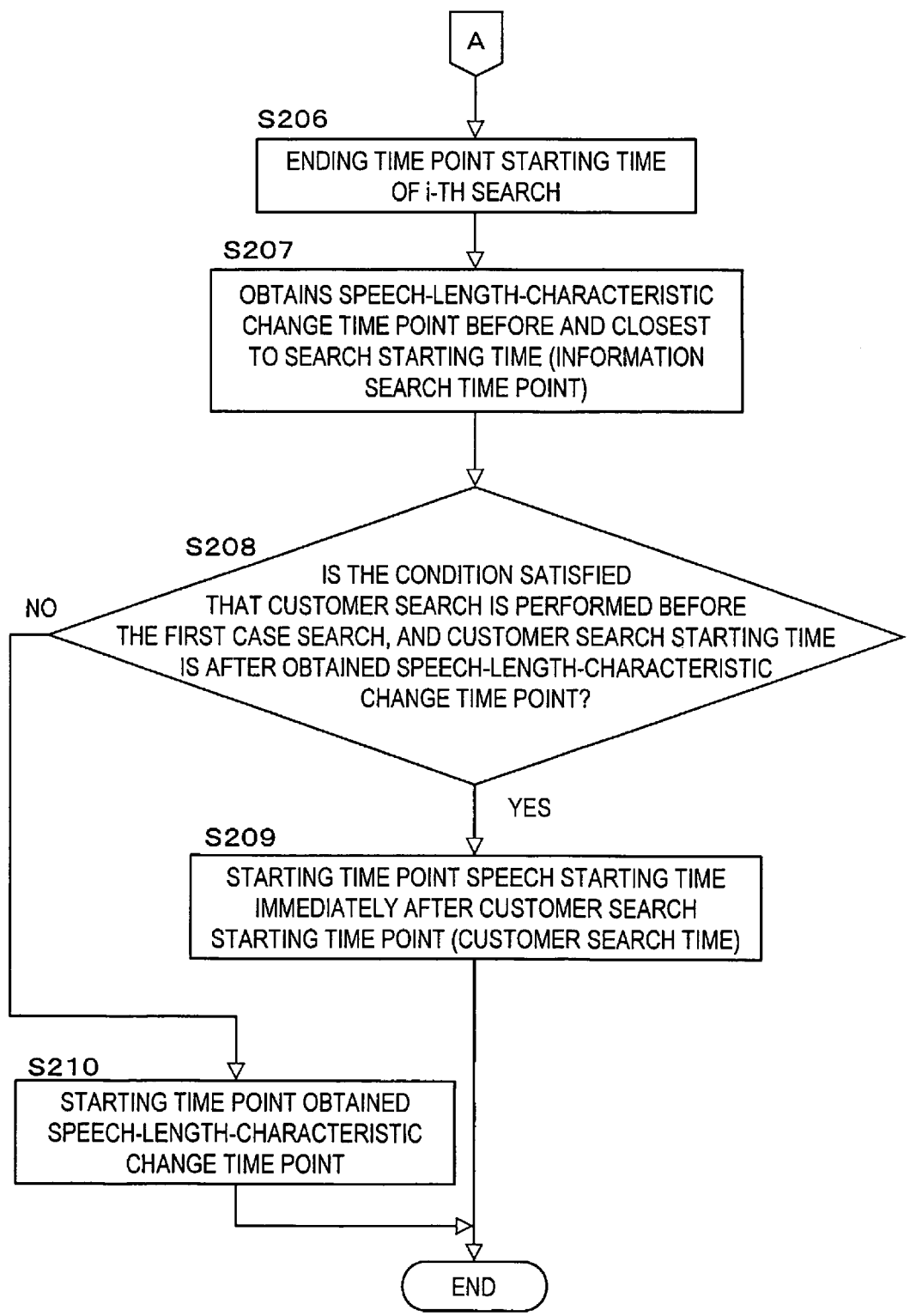

FIGS. 17 and 18 show a process flow of a processing for determining a part-to-elicit-failure-from.

The part-to-elicit-failure-from determination unit 105 obtains search starting times, search keys and search targets from the operation log data 202 as search execution information (step S200). As initial settings, the number of pieces of search execution information is set for n, and the counter i is reset to 0 (step S201). If i+1 is smaller than n (step S202: YES), then a-series-of-searches determination processing is performed (step S203). When the i-th and (i+1)-th searches are determined to be a series of searches (step S204: YES), 1 is added to the counter i (step S205), and the process returns to the processing at step S202.

On the other hand, if i+1 is not smaller than n (step S202: NO), or if it is determined that the i-th and (i+1)-th searches are determined not to be a series of searches (step S204: NO), then the part-to-elicit-failure-from determination unit 105 sets the search starting time shown in the i-th search execution information as the ending time point (step S206).

Furthermore, the part-to-elicit-failure-from determination unit 105 obtains the speech-length-characteristic change time point $P_{change}$ which is before and the closest to the search starting time (step S207). Then, it is determined whether or not the following determination condition is satisfied: "a customer search is performed before the first case search, and the customer search starting time is after the obtained speech-length-characteristic change time point $P_{change}$" (step S208). If this condition is satisfied (step S208: YES), then the part-to-elicit-failure-from determination unit 105 sets the speech starting time immediately after the customer search starting time as the starting time point (step S209). If this condition is not satisfied (step S208: NO), then the part-to-elicit-failure-from determination unit 105 sets the obtained speech-length-characteristic change time point $P_{change}$ as the starting time point (step S210).

Figure 19:
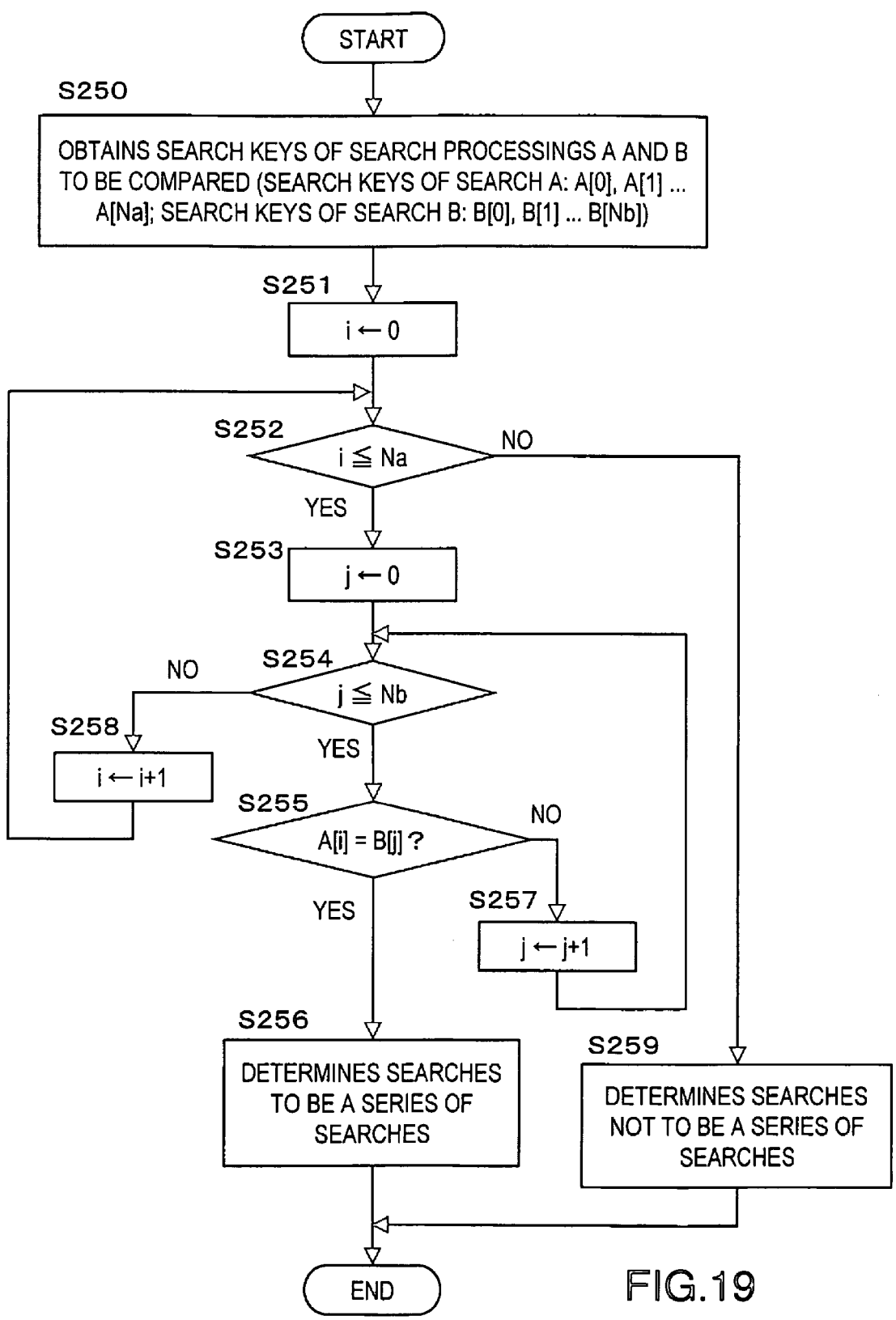
FIG. 19 shows a process flow of a-series-of-searches determination processing.

FIG. 19 shows a process flow of the a-series-of-searches determination processing (step S203).

The part-to-elicit-failure-from determination unit 105 obtains the search keys of search processing A and B to be compared and sets the search keys of the search processing A as A[0], A[1], . . . , A[Na], and the search keys of the search processing B as B[0], B[1], . . . , B[Nb] (step S250). The counter i is reset to 0 (step S251), and it is determined whether or not i is below Na (step S252). If i is below Na (step S252: YES), then a counter j is reset to 0 (step S253), and it is determined whether or not j is below Nb (step S254).

If j is below Nb (step S254: YES), then the part-to-elicit-failure-from determination unit 105 determines whether or not the search key A [i] and the search key B [j] correspond to each other (step S255). If the search key A [i] and the search key B [j] correspond to each other (step S255: YES), then the searches are determined to be a series of searches (step S256). On the other hand, if the search key A [i] and the search key B [j] do not correspond to each other (step S255: NO), 1 is added to the counter j (step S257), and the process returns to the processing at step S254.

If j is not below Nb at the processing at step S252 (step S254: NO), then 1 is added to the counter i (step S258), and the process returns to the processing at step S252.

If i is not below Na at the processing at step S252 (step S252: NO), then the searches are determined not to be a series of searches (step S259).

The present has been described above with the use of an embodiment thereof, various variations are naturally possible within the spirit of the present invention.

The present invention can be also embodied as a program which is read and executed by a computer. The program realizing the present invention can be stored in a suitable computer-readable recording medium such as a portable medium memory, a semiconductor memory and a hard disk. The program realizing the present invention is recorded in such a recording medium and provided. Alternatively, it is provided by sending/receiving using various communication networks, via a communication interface.

What is claimed is:

1. An apparatus for determining a part-to-elicit, which is to be taken out of spoken dialogue data in which conversation by a customer and an operator is recorded, the apparatus comprising:
    a spoken dialogue data storage unit for storing the spoken dialogue data between the customer and the operator is recorded;
    an operation log information storage unit for storing registered operation log information in which time information is attached to information about operations performed by the operator during the conversation with the customer;
    a speech length calculation unit for calculating, from the spoken dialogue data, speech lengths of speeches by each of the customer and the operator in the spoken dialogue data;
    a speech-length-characteristic change time point specification unit for estimating a conversation structure based on the lengths of the speeches by the customer and the operator, based on the speech lengths, and specifying a speech-length-characteristic change time point indicating the time when the speaker of the speech changes in the conversation structure; and
    a part-to-elicit determination unit for extracting, from the operation log information, an information search time point indicating the time when the operator performed an information search processing for particular content, determining the information search time point as the ending time point of a part-to-elicit from the spoken dialogue data, and determining a speech-length-characteristic change time point immediately before the information search time point as the starting time point of the part-to-elicit.

2. The apparatus according to claim 1, wherein, if multiple information search processing are extracted from the operation log information, the part-to-elicit determination unit determines whether or not the extracted information search processing are mutually related and then, in case the multiple information processing are determined to be mutually related, determines the last information search time point as the ending time point.

3. The apparatus according to claim 1, wherein, when the multiple information search processing are an operation of inputting a search condition and execution of a search processing under the search condition, the part-to-elicit determination unit determines the time point when the operation of inputting the search condition is started as the ending time point.

4. The apparatus according to claim 1, wherein, when an information search processing, the search target of which is different from that of the multiple information search processing is extracted together with the multiple information search processing, the part-to-elicit determination unit determines the time point which is after a speech-length-characteristic change time point immediately before the time points of the multiple information searches and after the time point when the different information search processing is performed and at which a speech by the customer is first started, as the starting time point.

5. The apparatus according to claim 1, further comprising a part-to-elicit extraction unit for extracting the part-to-elicit which has been determined by the part-to-elicit determination unit, from the spoken dialogue data.

6. The apparatus according to claim 5, wherein the part-to-elicit extraction unit extracts a section obtained by removing a voiceless part from the part-to-elicit which has been determined by the part-to-elicit determination unit.

7. A method for a computer to determining a part-to-elicit, which is to be taken out of spoken dialogue data in which the content of conversation by a customer and an operator is recorded; the method comprising the steps of:
    obtaining the spoken dialogue data between the customer and the operator is recorded;
    obtaining operation log information in which information about operations performed by the operator during the conversation with the customer is registered together with time information;
    calculating the speech lengths of speeches by each of the customer and the operator in the spoken dialogue data;
    estimating the conversation structure based on the lengths of the speeches by the customer and the operator, based on the speech lengths, and specifying a speech-length-characteristic change time point indicating time when the speaker of the speech changes in the conversation structure;
    extracting, from the operation log information, an information search time point indicating the time when the operator performed an information search processing for particular content; and
    determining the information search time point as the ending time point of a part-to-elicit from the spoken dialogue data and a speech-length-characteristic change time point immediately before the information search time point as the starting time point of the part-to-elicit.

8. The method according to claim 7, wherein, if multiple information search processing are extracted from the operation log information, the part-to-elicit determination step determines whether or not the extracted information search processing are mutually related and then, in case the multiple information processing are determined to be mutually related, determines the last information search time point as the ending time point.

9. The method according to claim 7, wherein, when the multiple information search processing are an operation of inputting a search condition and execution of a search processing under the search condition, the part-to-elicit determination step determines the time point when the operation of inputting the search condition is started as the ending time point.

10. The method according to claim 7, wherein, when an information search processing, the search target of which is different from that of the multiple information search processing is extracted together with the multiple information search processing, the part-to-elicit determination step determines the time point which is after a speech-length-characteristic change time point immediately before the time points of the multiple information searches and after the time point when the different information search processing is performed and at which a speech by the customer is first started, as the starting time point.

11. The method according to claim 7, further comprising a step of extracting the part-to-elicit which has been determined by the part-to-elicit identification step, from the spoken dialogue data.

12. The method according to claim 11, wherein the part-to-elicit extraction step extracts a section obtained by removing a voiceless part from the part-to-elicit which has been identified by the part-to-elicit identification step.

13. A non-transitory computer-readable recording medium storing a program for causing a computer to execute a processing for determining a part-to-elicit, which is to be taken out of spoken dialogue data in which the content of conversation by a customer and an operator is recorded; the program product causing the computer to execute:
   a spoken dialogue data acquisition processing for obtaining the spoken dialogue data between the customer and the operator is recorded;
   an operation log information acquisition processing for obtaining operation log information in which information about operations performed by the operator during the conversation with the customer is registered together with time information;
   a speech length calculation processing for calculating the speech lengths of speeches by each of the customer and the operator in the spoken dialogue data;
   a speech length-characteristic change time point identification processing for estimating the conversation structure based on the lengths of speeches by the customer and the operator, based on the speech lengths, and specifying a speech-length-characteristic change time point indicating time when the speaker of the speech changes in the conversation structure; and
   a part-to-elicit identification processing for extracting, from the operation log information, an information search time point indicating the time when the operator performed an information search processing for particular content, determining the information search time point as the ending time point of a part-to-elicit from the spoken dialogue data, and determining a speech-length-characteristic change time point immediately before the information search time point as the starting time point of the part-to-elicit.

14. The non-transitory computer-readable recording medium according to claim 13, wherein, if multiple information search processing are extracted from the operation log information, the part-to-elicit determination processing causes the computer to perform a processing for determining whether or not the extracted information search processing are mutually related and then, in case the multiple information processing are determined to be mutually related, determining the last information search time point as the ending time point.

15. The non-transitory computer-readable recording medium according to claim 13, wherein, when the multiple information search processing are an operation of inputting a search condition and execution of a search processing under the search condition, the part-to-elicit determination processing causes the computer to perform a processing for determining the time point when the operation of inputting the search condition is started as the ending time point.

16. The non-transitory computer-readable recording medium according to claim 13, wherein when an information search processing, the search target of which is different from that of the multiple information search processing is extracted together with the multiple information search processing, the part-to-elicit identification processing causes the computer to execute a processing for determining the time point which is after a speech length-characteristic change time point immediately before the time points of the multiple information searches and after the time point when the different information search processing is performed and at which a speech by the customer is first started, as the starting time point.

17. The non-transitory computer-readable recording medium according to claim 13, further causing the computer to execute a part-to-elicit extraction processing for extracting the part-to-elicit which has been determined by the part-to-elicit identification processing, from the spoken dialogue data.

18. The non-transitory computer-readable recording medium according to claim 17, wherein the part-to-elicit extraction processing causes the computer to execute a processing for extracting a section obtained by removing a voiceless part from the part-to-elicit identified by the part-to-elicit identification processing.

\* \* \* \* \*